United States Patent [19]

Manning

[11] Patent Number: 4,618,904
[45] Date of Patent: Oct. 21, 1986

[54] MAGNETIC TAPE CASSETTE ISOLATOR

[75] Inventor: George H. Manning, Nashua, N.H.

[73] Assignee: Memtec Corporation, Salem, N.H.

[21] Appl. No.: 466,015

[22] Filed: Feb. 14, 1983

[51] Int. Cl.[4] ............................................. G11B 23/04
[52] U.S. Cl. ................................. 360/132; 360/130.21
[58] Field of Search ................. 360/128, 130.2, 130.21, 360/131, 132, 134; 242/179, 199, 197, 194, 193, 189, 186

[56] References Cited

U.S. PATENT DOCUMENTS

| | | | |
|---|---|---|---|
| 3,601,654 | 8/1971 | Long et al. ........................... | 360/132 |
| 3,800,322 | 3/1974 | Schoettle et al. .................... | 360/128 |
| 3,913,145 | 10/1975 | Wiig ..................................... | 360/132 |
| 3,923,271 | 12/1975 | Pertzch et al. ......................... | 352/72 |
| 4,032,987 | 6/1977 | Singer et al. ......................... | 360/132 |
| 4,181,089 | 1/1980 | Sato ..................................... | 360/132 |

FOREIGN PATENT DOCUMENTS 2160508  6/1973  Fed. Rep. of Germany ...... 360/132

Primary Examiner—John H. Wolff
Assistant Examiner—Matthew J. Bussan
Attorney, Agent, or Firm—Cesari and McKenna

[57] ABSTRACT

In a magnetic tape cassette, the cassette housing is divided between the two roll cores by an elongated isolator extending from the working edge of the cassette to the opposite edge thereof to prevent tape loops formed in the housing adjacent one roll core due to a slack tape condition from propagating to the other core where they could become snagged by tape winding onto that other core thereby causing a tape jam or break. One end of the isolator is pivotally mounted to the housing so that the isolator can swing freely between the two roll cores as the amount of tape wound on the two cores varies and, during operation of the cassette, the isolator does not exert any appreciable drag on the rotating tape rolls.

4 Claims, 2 Drawing Figures

MAGNETIC TAPE CASSETTE ISOLATOR

This invention relates to a magnetic tape cassette. It relates more particularly to apparatus for preventing slack tape present as twists or loops within the cassette housing from being caught and wound inadvertently onto the winding roll core.

BACKGROUND OF THE INVENTION

Known magnetic tape cassettes comprise a generally rectangular housing which rotatively supports within the housing a pair of roll cores that are aligned parallel to the working edge of the housing which is formed with an aperture for receiving the magnetic head of an associated cassette drive. The opposite ends of a length of tape are wound around the two roll cores and an intermediate stretch of tape is positioned by guide rollers just inside the working edge so that it can be engaged by the magnetic head projecting into that aperture. The cassette cores contain sprocket holes which are engaged by the spindles of the cassette drive which rotate the two cores in one direction or the other so that the tape is moved past the head and wound up on one roll core or the other.

A problem has arisen due to the formation of slack tape loops or twists within the housing which can become caught by and wound onto the winding roll core. This tends to stop the tape advance and/or cause the tape to break. In some cases, the cassette can be taken apart and the tape repaired; but in many instances the cassette cannot be so repaired and is just thrown away.

The aforesaid jam-forming slack tape loops are not formed, in the main, when the cassette is in operation. Rather, they arise when the cassette is being handled. In other words, someone might turn one of the roll cores by its sprocket hole so as to unroll the tape and form a tape loop or loops within the cassette housing. In some instances, such slack tape might engage the outermost tape turn on one of the roll cores. If, when the cassette is next used, that roll core is rotated in the winding direction, the slack tape can be caught by the tape winding onto that core. The engaged loop tends to pull the tape in the opposite direction around the tape guide rollers causing a tape break or the winding roll core becomes jammed, resulting in damage to the cassette and sometimes even to the associated tape cassette drive. The same problem can arise when an operator ejects the cassette from the cassette drive while the tape is advancing. In this case, the slack tape condition in the cassette is due to the residual inertia of the unwinding tape roll.

THE PRIOR ART

It is known to position tape guides between the roll cores of various tape and ribbon cartridges and cassettes to help guide the tape from one roll core to the other. Invariably, however, these prior guides are intended to function while the cassette is in use and the tape is moving from one roll core to the other. They are not intended to, nor do they, prevent the formation of jam-forming slack tape loops as the cassette is being handled or is being ejected from its drive unit. This is because the tape guides utilized in prior cassettes and cartridges of this general type are not isolators. Rather, they are basically tape tensioning devices which forcibly engage against the outer turns of tape on one or both roll cores to ensure that the tape is tightly wound on those cores. Examples of such prior cassette tape guides are disclosed in U.S. Pat. Nos. 2,568,339; 3,722,829 and 4,013,160.

As seen from those patented cassettes and cartridges, a slack tape condition adjacent one roll can still form loops which can propagate over to the other tape roll and be caught by the advancing tape when that other roll is next turned in the winding direction.

Another type of device for controlling the winding of tape in a cassette is d.:sclosed in U.S. Pat. No. 3,923,271. That device consists of a special bow member mounted in the cassette housing which slides back and forth along the housing and a leafspring projecting up from that bow between the two roll cores. That leafspring does not isolate the two tape rolls in the cassette. Furthermore, that tape guide is quite complicated and requires a special cassette housing to accommodate the sliding bow member.

These and other similar tape cassette guides of which we are aware are disadvantaged in other respects in that they are overly complex and relatively expensive to manufacture.

SUMMARY OF THE INVENTION

Accordingly, the present invention aims to provide an improved magnetic tape cassette.

Another object of the invention is to provide a magnetic tape cassette whose tape does not become twisted or snarled in the cassette housing.

A further object of the invention is to provide such a cassette which does not jam after its tape has slackened inside the cassette housing.

Still another object of the invention is to provide a magnetic tape cassette which contains the tape loops that can form inside the tape housing so that they do not become caught in the winding tape roll.

Another object of the invention is to provide a magnetic tape cassette of this general type which, while having one or more of the aforesaid advantages, does not depart appreciably from the usual cassette structure in present day use.

Yet another object of the invention is to provide such a cassette which does not cost appreciably more than a conventional cassette of this general type.

Other objects will, in part, be obvious and will, in part, appear hereinafter.

The invention accordingly comprises the features of construction, combination of elements and arrangement of parts which will be exemplified in the following detailed description, and the scope of the invention will be indicated in the claims.

The present cassette has the same basic construction and configuration as prior conventional magnetic tape cassettes in general use today. It includes a thin generally rectangular cassette housing, one long working edge of which is formed with an aperture for receiving the magnetic read/write head of a cassette drive unit. A pair of spaced-apart roll cores are rotatively mounted in the housing walls along a line parallel to the working edge of the cassette. The roll cores are formed with sprocket holes for receiving drive spindles which rotate the cores in one direction or another. A length of magnetic tape is wound between the two cores and a pair of guide rollers at the opposite ends of the working edge of the cassette guide a stretch of tape along just inside that edge so that it is contacted by the magnetic head as the tape is wound from one core to the other.

In order to minimize or prevent the occurrence of magnetic tape breaks, jams and snarls due to a slack tape condition inside the cassette housing, the housing spaces containing the two roll cores are isolated from one another by a movable wall or barrier which extends from the active edge of the cassette all the way to the opposite edge thereof. This movable barrier is in the form of an elongated arm pivoted at one end to the housing wall between the cores adjacent one long edge of the cassette. The opposite end of the arm, which extends to the opposite edge of the cassette, is free to swing back and forth between the two roll cores. The opposite sides of the arm facing the cores are concavely curved to conform to the curvature of a full roll of tape wound onto either of the two roll cores.

When there is an equal amount of tape wound on both cores, the isolator arm extends more or less perpendicular to the active edge of the cassette. On the other hand, when one of the roll cores carries a full roll of tape, the isolator arm is displaced toward the other core by that full roll of tape. Thus, at all times, the isolator arm provides a barrier that completely isolates the space in the cassette housing containing one roll core and the roll of tape thereon from the housing space containing the other roll core and its roll of tape. Likewise, the stretches of tape extending from the two roll cores and around their respective guide rollers are isolated from one another. The tape is only able to pass from one housing space to the other through a small gap between the active edge of the cassette and the adjacent end of the isolator arm.

Thus, if one of the tape cores should be rotated in the tape unwinding direction so as to slacken the tape inside the housing, the tape lengths adjacent that core can loop and festoon. However, all of those loops will be confined by the isolator arm to the space inside the cassette housing containing that roll core. None of those slack tape loops can propagate around the isolator arm to the tape trained around the opposite roll core. Resultantly, if the cassette should be inserted into a cassette drive and driven in either direction, the tape loop or festoon present in the housing due to the aforesaid slack tape condition will be consumed in an orderly fashion and wound on the winding roll core before additional tape is drawn from the unwinding core.

It is important to note that the isolator arm swings freely between the tape rolls wound on the two roll cores. Therefore, it does not tend to retard the rotation of either of the cores. Consequently, there is no abrupt change in the tension of the tape when the tape loop or festoon is consumed by the winding roll core. In other words, when the slack tape condition is relieved, the unwinding core is completely free to rotate. This is in sharp contrast to the situation that prevails in some conventional cassettes described above which have tape rollers or guides biased against the tape rolls. Such biased guides inhibit rotation of the unwinding roll core so that there is a sharp increase in tape tension just as the slack tape condition is relieved and tape is first drawn from the unwinding role core.

The tape in applicant's cassette, then, can be advanced in either direction with minimum likelihood of the tape twisting or breaking or causing jams. Also, while the isolator described herein is concerned primarily with minimizing the formation of and effects of slack tape loops inside the cassette when the cassette is not being driven, the isolator also helps to guide the tape to and from the tape rolls on the cores during normal operation of the cassette.

The isolator arm described herein can be incorporated into many magnetic tape cassettes of more or less conventional construction. Furthermore, the arm itself is a simple molded plastic part that can be made quite inexpensively in quantity. Therefore, the cost of manufacturing applicant's cassette is not appreciably greater than prior conventional cassettes that do not possess this ability to minimize tape snags.

BRIEF DESCRIPTION OF THE DRAWING

For a fuller understanding of the nature and objects of the invention, reference should be had to the following detailed description, taken in connection with the accompanying drawing, in which.

DESCRIPTION OF THE PREFERRED EMBODIMENT

Figure 1:
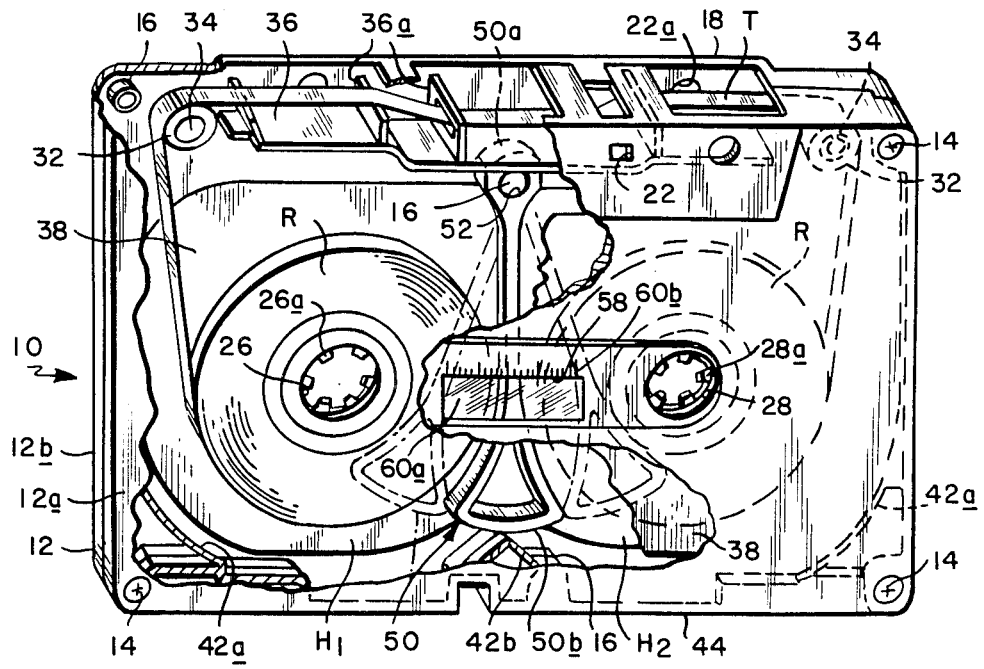
FIG. 1 is an isometric view with parts broken away showing a magnetic tape cassette embodying the features of this invention.

Referring to FIG. 1, a magnetic tape cassette made in accordance with this invention is indicated generally at 10. It comprises a thin, generally rectangular housing 12 composed of two half shells 12a and 12b connected together by screws 14 extending through shell 12a and threaded into stand offs 16 projecting out from shell 12b. Housing 12 has a long narrow edge 18 which constitutes the working edge of the cassette. That working edge 18 is formed with an aperture 22 midway between its ends for accommodating the usual magnetic read/write head of the drive unit (not shown) in which the cassette 10 is used. Additional apertures 22a are present in that same edge for receiving a tachometer wheel, an end of tape sensor or other such components usually found in present day cassette drives to control the movement of the tape in the cassette.

The usual pair of roll cores 26 and 28 are rotatively mounted in opposite walls of housing 12. Cores 26 and 28 are spaced apart along a line that is parallel to the working edge 18. The cores contain sprocket holes 26a and 28a which are engaged in the usual way by the rotary spindles of the cassette drive to rotate the cores in one direction or the other. The cassette 10 specifically illustrated herein is a so-called reel-to-reel driven cassette which is the type most used in digital or computer applications. However, the cassette could just as well be of the capstan-driven variety used, for example, in audio applications.

A length of tape T is wound as rolls R on cores 26 and 28. The tape extends between the two rolls by way of a pair of axially-spring-loaded guide rollers 32 rotatively mounted on axles 34 located adjacent opposite ends of the cassette working edge 18. The guide rollers guide the tape so that the tape follows a straight path just inside the cassette working edge 18 so that the tape is in position to be engaged by the magnetic head and other drive components that project through apertures 22 and 22a. A molded plastic insert wall 36 extends between guide rollers 32 just inside the cassette edge 18. That wall has ribs 36a which project toward edge 18 and thus help define the side walls of apertures 22 and 22a. The two middle ribs 36a are slotted to receive tape T and thus function as tape carriers or guides. Preferably, thin carbon-loaded polytetrafluoroethylene slip sheets 38 are positioned between the opposite faces of rolls R and the housing walls to reduce the frictional drag on the tape rolls as they are turned.

Two arcuate ribs 42a project out from housing shell 12b adjacent the ends of the long housing edge 44 opposite its edge 18. An additional two ribs 42b project up midway along that edge 44. Each rib 42a and 42b pair defines a part of a circle whose diameter is slightly larger than the largest possible diameter of a tape roll R. These ribs thus help to contain and guide the tape T within housing 12.

Figure 2:
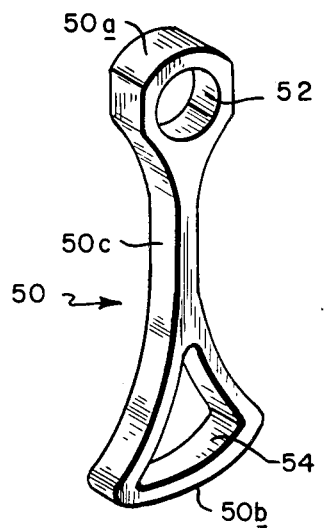
FIG. 2 is a perspective view on a larger scale showing a component of the FIG. 1 cassette in greater detail.

The present cassette 10 departs from prior similar structures mainly in that it includes a tape isolator indicated generally at 50. Isolator 50 is in the form of a relatively long arm which extends from the housing edge 18 to the opposite housing edge 44. As shown in FIGS. 1 and 2, the arm end 50a adjacent edge 18 is relatively narrow or thin and it is formed with an opening 52 for loosely receiving a standoff 16 located just inside and midway along insert wall 36. That pivotal connection allows the arm to swing freely in the space between the tape rolls R and the two roll cores 26 and 28.

The isolator end 50b adjacent cassette housing edge 44 is wider than end 50a and it is curved to some extent so that arm end 50b just clears the two housing ribs 42b as the arm swings back and forth. Also, the opposite sides 50c of the arm which face cores 26 and 28 are curved inwardly to more or less correspond to the curvature of the perimeter of a full tape roll R wound on core 26 or 28. Finally, an opening 54 is formed adjacent the arm end 50b to save material, to facilitate molding the arm and to minimize weight at that end of the arm.

Referring to FIG. 1, the isolator arm 50 can swing between a position wherein it engages core 28 when all of the tape T is wound on core 26 and a position wherein it engages core 26 when all of the tape is wound onto core 28. These two extreme positions are indicated in dotted lines in FIG. 1. However, the excursion of the arm at any given time is limited by the sizes of the tape rolls R then wound on the two cores. It is important to note also that the width of the arm is such that the buildup of tape on one roll core does not push the arm into frictional engagement with the tape roll on the other roll core. In other words, the arm should exert little or no drag on either of the two rolls R when they are rotating. That is one reason for including the weight and moment-reducing opening 54 adjacent the free end of the arm 24.

If desired, as shown in FIG. 1, a transparent window 58 may be formed in one wall of housing 12 between the roll cores 26 and 28 and indicia 60a and 60b can be inscribed on the arm 50 and the window respectively so that one can determine immediately by the location of the arm in the window the amounts of tape present on the two roll cores at any given time.

As clearly seen from FIG. 1, arm 50 is free to assume any position between its two extreme positions shown in dotted lines in FIG. 1, depending upon the relative sizes of the tape rolls R on cores 26 and 28. No matter what its position, however, the arm 50 completely isolates the space $H_1$ inside housing 12 containing core 26 and its surrounding roll R and the space $H_2$ containing core 28 and its roll R. Therefore, if the tape T should become slack due to intentional or unintentional rotation of one of the roll cores in the unwinding direction, any resultant tape loops or festooning adjacent that core will be confined to the housing space $H_1$ or $H_2$ containing that core; such loops cannot propagate to the other housing space.

Thus, for example, if the core 26 should be rotated clockwise, either manually or due to the inertia of the tape roll on that core, the tape segment to the left of isolator arm 50 will become slack and form one or more loops or bights in the space $H_1$ adjacent core 26. In an extreme situation, the tape may actually form a festoon which occupies a large part of that space. However, because of the presence of the isolator 50 (as well as ribs 42a and 42b), the amount of space in which such a festoon can form is minimized and as soon as that space fills up, the presence of that slack tape tends to inhibit further unwinding rotation of the roll core 26. In any event, no matter how slack that segment of tape from core 26 becomes, tape loops cannot propagate past the isolator 50 into space $H_2$ where they could contact the tape engaging around the opposite core 28. Consequently, when the cassette is next used and, if core 28 should be driven in the winding direction, there is no possibility of the tape winding onto core 28 snatching or grabbing a tape loop produced by the previous unwinding of core 26 which caused the slack tape condition.

Rather, upon the rotation of core 28 in the winding direction, tape is drawn from the tape festoon formed in the housing space $H_1$ until the slack tape is consumed. Then tape is immediately drawn from the unwinding roll core 26. Since the isolator arm 50 does not exert any appreciable drag on the tape roll on core 26, the end of the slack tape condition when tape is first drawn from core 26 is not marked by any drastic increase in tape tension that could cause the tape to break.

More or less the same thing would occur if the left-hand core 26 were rotated in the winding direction when the cassette is next used with a slack tape condition in housing space $H_1$. That is, the winding roll 26 would draw tape from the slack loops or festooning in space $H_1$ until the tape is taut at which point tape would be drawn from core 28 without the occurrence of any great increase in tape tension.

Of course, if the opposite core 28 were unwound to create a slack tape condition in the space $H_2$ to the right of isolator 50, a similar orderly restoration to a taut tape condition would occur when the cassette is next used no matter how large the tape rolls are on each core. In no event, can slack tape extend or propagate above, below or around the isolator arm 50 because the clearances between the arm and insert wall 36 and between the arm and the various ribs and walls of housing 12 at all positions of the arm are too small to permit that.

Furthermore, when the cassette 10 is operating and the tape is being advanced in one direction or the other in the cassette, because there is minimum clearance between the opposite sides of arm 50 and the perimeters of the tape rolls R on the two cores 26 and 28, the tape is guided by the arm to and from the tape rolls R so that the tape does not tend to twist and so that the tape turns on the rolls remain tight and concentric to the roll cores.

It will be appreciated from the foregoing, then, that the isolator 50 minimizes the occurrence of tape breakage and tape jams due to a slack tape condition in the cassette. The isolator is a simple molded plastic part which can be manufactured quite inexpensively and incorporated into a more or less conventional cassette without changing the cassette's basic structure and configuration. Therefore, the present invention can be practiced at minimum cost and inconvenience to the manufacturers and users of magnetic tape cassettes.

It will thus be seen that the objects set forth above, among those made apparent from the preceding description, are efficiently attained. Also, certain changes may be made in the above construction without departing from the scope of the invention. For example, in some cases, the pivoted arm end 50a could be located adjacent cassette edge 44 so that arm end 50b swings just inside insert wall 36. Therefore, it is intended that all matter contained in the above description or shown in the accompanying drawing be interpreted as illustrative and not in a limiting sense.

It is also to be understood that the following claims are intended to cover all of the generic and specific features of the invention herein described.

What is claimed as new and desired to be secured by Letters Patent of the United States is:

1. In a magnetic tape cassette of the type including a generally rectangular housing having an edge, which constitutes the working edge of the cassette, formed with an aperture for receiving a magnetic head, a pair of spaced-apart roll cores rotatively mounted to opposite walls of the housing along a line spaced parallel to said working edge, a length of magnetic tape having its opposite ends wound on the two roll cores, and a pair of guides mounted at the opposite ends of said working edge for guiding a stretch of tape from one roll core along just inside said working edge of the housing to the other roll core, the improvement comprising
   A. an elongated tape isolating arm positioned between the tape cores and having one and located adjacent said cassette working edge and said arm extending substantially from said cassette working edge to the opposite edge of the housing and having opposite sides facing said cores which are concavely curved to correspond substnatially to the curvature of the largest diameter tape roll wound onto a said core;
   B. means for pivotably mounting said one end of said arm to the housing whereby the arm
      (1) swings freely within the housing between the two roll cores and prevents slack tape from adjacent one core from looping or twisting within the housing so that is snagged by and wound up with tape on the other roll core when the cassette is next operated, and
      (2) exerts negligible drag on the rotating tape rolls when the cassette is in operation; and
   C. arcuate ribs adjacent said cassette opposite edge and extending between said opposite housing walls so as to partially extend around and help guide the tape to and from said cores, the free end of said arm just clearing segments of said ribs located between said cores.

2. The cassette defined in claim 1 and further including wall means positioned between said working edge and said one arm end, just clearing the latter.

3. The cassette defined in claim 1 and further including a transparent window formed in one of said opposite housing walls and extending between said cores by which the position of said arm between the cores may be observed.

4. The cassette defined in claim 3 and further including indicia associated with said arm and said window for identifying the amounts of said tape wound onto said roll cores.

* * * * *